May 10, 1927.
C. JONES
1,628,542
COTTON CULTIVATOR
Filed Dec. 3, 1925
2 Sheets-Sheet 1

Inventor
Charlie Jones.
By William C. Linton
Attorney

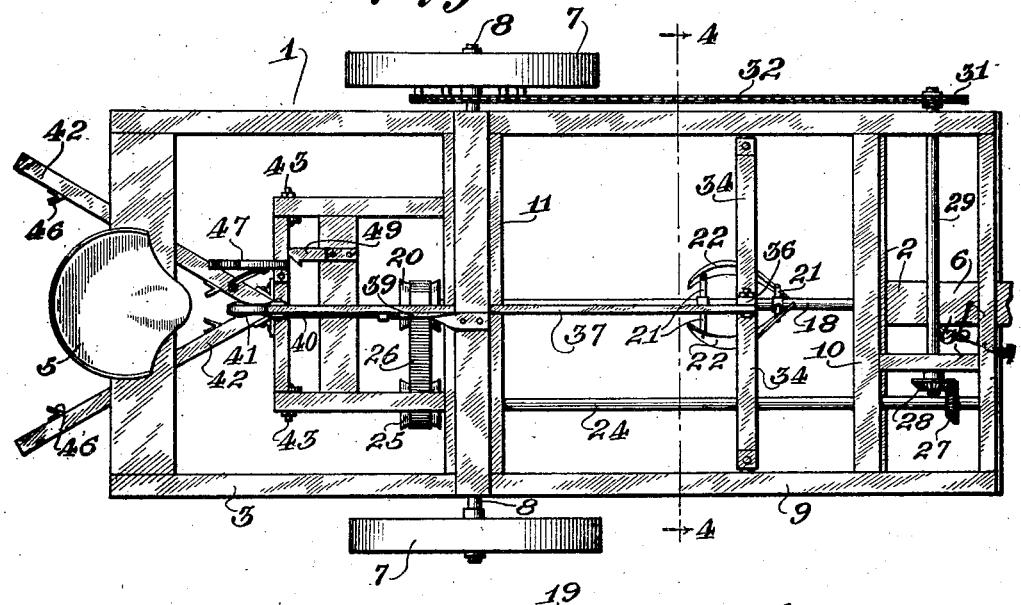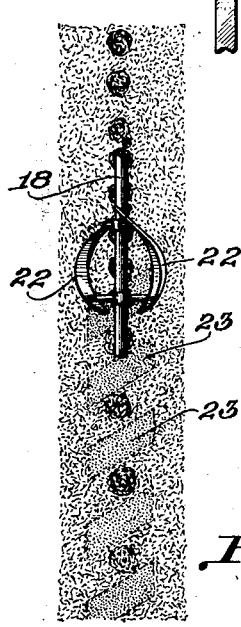

Patented May 10, 1927.

1,628,542

UNITED STATES PATENT OFFICE.

CHARLIE JONES, OF WHITE PLAINS, NEW YORK.

COTTON CULTIVATOR.

Application filed December 3, 1925. Serial No. 73,007.

This invention relates to improvements in cultivators and particularly to a cultivator of the rotary knife type, especially adaptable for use in the cultivation of cotton plants, whereby such plants, when small, may be "thinned out" in such a manner as to promote growth and production of the remaining plants, the invention having for an object to provide a novel and efficient form or construction of cultivator blades which when adjusted to the proper height will, with rotation, clear spaces of vegetation at regular intervals, the knives during this operation remaining in contact with the soil and hence, preventing the transmission of detrimental shocks or stresses to the cultivator or the working parts thereof, such as are experienced in the type of cultivator employing rotary hoe-like blades which intermittently contact with the soil.

It is another and equally important object of the invention to provide a cultivator of the character mentioned wherein an adjustable knife carrying or supporting frame is employed, said frame being adjustable by mechanical means in order that it may be raised or lowered with respect to the soil whereby to effect proper positioning of the cultivator blades in such soil and with respect to the plants.

Yet another object of the invention is to provide a cotton cultivator which in addition to "thinning out" the small plants, will work or cultivate the soil subsequently to the "thinning out" operation, thereby promoting growth of the remaining plants, the invention to this end comprehending an adjustable frame carrying cultivator plows, which when desired, may be supported and retained in an inoperative position.

Other objects of the invention will be in part obvious and in part pointed out hereinafter.

In order that the invention and its mode of operation may be readily understood by persons skilled in the art, I have in the accompanying illustrative drawings, and in the detailed following description based thereupon, set out one possible embodiment of the same.

In these drawings:

Figure 3 is a plan view of the improved machine,

Figure 1:
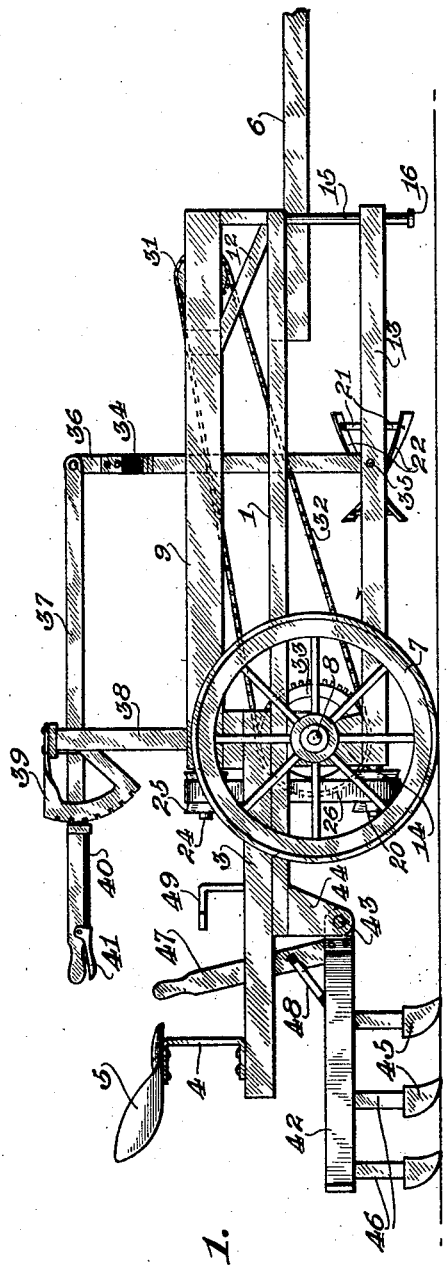
Figure 1 is a side elevation of the improved cotton cultivator.

Figure 4 is a vertical transverse section taken on the line 4—4 of Figure 3 looking in a direction in which the arrows point, Figure 5 is a fragmentary detail in plan showing the manner in which the rows of small cotton plants are "thinned out" by the rotating blades, and Figure 6 is a fragmentary detail partly in section, showing the mode of engagement of the guide legs with the pivotally mounted cultivator blade supporting frame.

Having more particular reference to the drawings, in connection with which like characters of reference will designate corresponding parts throughout, the improved cultivator may be stated to comprise a substantially rectangular frame indicated in its entirety herein by the numeral 1, said frame comprising longitudinally and transversely disposed angle bars interconnected at their meeting or adjoining ends, the forward end of said body having a transversely disposed bracing bar 2, arranged upon the same and rigidly connected to adjacent portions of the opposite side of said body. A secondary frame constructed of suitable material and indicated herein by the numeral 3 is received upon the rearward portion of the body 1, being rigidly secured thereto through suitable fastening devices. This frame 3 carries a standard 4 upon its rearward end to which an operator's seat 5 is secured for an obvious purpose. A draft connection or pole 6 is provided upon the forward end of this body portion 1, the rearward or adjacent end of such connection or pole 6 being suitably secured to the intermediate portion of the forward end bar and bracing bar 2 of said body 1 in the manner as is indicated in the Figures 1 and 2. In this way, it will be understood that a suitable draft means may be connected to the cultivator machine and such machine then drawn over the surface or field to be cultivated.

Figure 2:
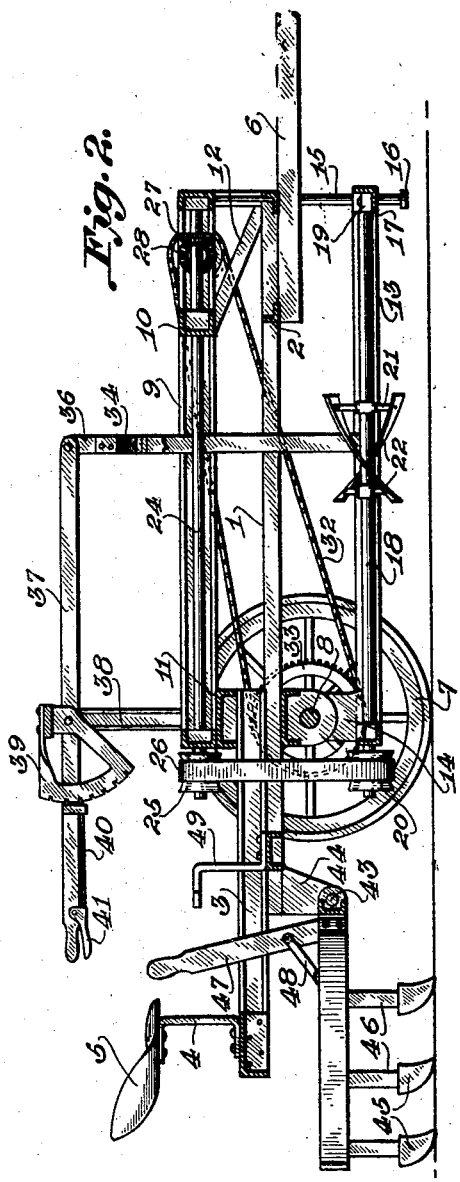
Figure 2 is a vertical longitudinal section through the same.

Wheels 7 are provided the body portion 1, such wheels being mounted upon the extremities of a transversely disposed axle 8 secured to the under side and rearward portion of the body 1 in a manner as indicated in the Figure 2.

A forwardly disposed supporting frame 9 is carried by the body 1 and, as will be noted, this supporting frame consists of longitudinally and transversely disposed bars arranged above but in substantially parallelism to the bars of the frame 1, a transversely disposed bar 10 being secured at its opposite end to the adjacent inner sides of the forward portions of the side bars of said supporting frame 9, immediately above the bracing bar 2 aforesaid. This supporting frame 9 is rigidly secured with respect to the body 1, the rearward ends thereof resting upon supports 11 secured to the adjacent portion of the secondary frame 3 while the forward portion of such supporting frame 9 is braced with respect to the corresponding portion of the body 1 through the medium of diagonally disposed brace bars 12, having suitable connections with adjacent portions of said frame 9 and said body 1.

A pivotally mounted cultivator blade carrying and supporting frame 13 is also provided the body portion of the cultivator, this supporting frame 13 comprising interconnected longitudinally and transversely disposed angle bars, the rearward portions of which have vertically disposed hanger arms 14 rigidly connected thereto, such arms in turn, being pivotally mounted or received upon adjacent portions of the axle 8. In this way, it will be understood that the rearward portion of the supporting frame 13 will be pivotally supported with respect to the body 1 of the cultivator and to limit this pivotal movement of said frame 13, as well as to prevent undesirable or objectionable lateral movement of the same, vertically disposed guide legs 15 are rigidly secured at their upper ends to the adjacent forward portions of the body 1 in the manner shown in the Figure 1, the lower ends of these legs being enlarged or headed as at 16 while their intermediate portions are passed through slots 17 formed in adjacent portions of the opposite sides of the pivotal supporting frame 13. Thus, it will be seen that the frame 13 will be limited in its pivotal movement with respect to the body 1 and likewise, that undue lateral movement thereof upon its pivotal mounting or at the forward end thereof will be prevented.

A cultivator blade carrying shaft 18 is disposed longitudinally of the intermediate portion of the frame 13, having the opposite ends thereof journaled in suitable bearings 19 secured to the end bars of said frame 13, the rearward end of said shaft 18 being extended for a distance beyond the rearward end bar of its supporting frame and provided with a fixedly mounted pulley 20, the purpose of which will be hereinafter more fully described. Mounted for rotary movement upon the intermediate portion of the shaft 18 are spider bracket arms 21, the extremities of which carry curved and obliquely disposed cultivator blades 22, such blades being arranged in opposed relation as is clearly shown in the Figures 2 and 5, and adapted, with rotation, to clear spaces between small cotton plants in the fashion as indicated in the Figure 5, that is, the blades will engage and sever certain of the cotton plants in rows treated thereby, thus effecting the so-called "thinning out" of such plants whereby to promote and increase their growth and yield. In this connection, it will be noted that the spaces cut or cleared between the small cotton plants of a row are diagonally disposed as is indicated by the numeral 23 in the Figure 5, this being because of the spiral like arrangement of the cultivator blades 22 upon their supporting brackets 21. Subsequently to the lowering or adjusting of the cultivator blades 22 to the proper height with respect to the soil and small cotton plants to be cultivated thereby, it will be appreciated that said blades will constantly remain in contact with the soil and with the plants, but because of the curved formation thereof, they will only serve to cut clearance spaces between the small plants as is indicated in the Figure 5, thus bringing about the desirable "thinning out" of such plants. Because of this constant engagement of the cultivator blades 22 with the soil and with the small cotton plants, it will be understood that the transmission of detrimental shocks and stresses to the cultivator and the working parts thereof will be avoided, in that the application of stress to the machine will be continuous and will not be of the sort which is experienced in those types of cultivators employing relatively spaced rotatable hoe-like blades, such blades during rotation, intermittently engaging the soil and vegetation in process of cultivation and hence, imparting shock or stress to the machine at each and every such engagement.

With a view toward providing the cultivator with means for transmitting rotary motion to the cultivator blade carrying shaft 18, an intermediate driven shaft 24 is disposed longitudinally of one side of the frame 9, being mounted in suitable bearings at the opposite ends thereof, while one end of the shaft is extended and supplied with a fixedly mounted pulley 25, about which one end of an endless power transmitting belt 26 is engaged, the opposite end of such belt being engaged about the peripheral portion of the pulley 20 upon the cultivator blade carrying shaft 18. A beveled gear 27 is fixedly mounted upon the forward portion of this intermediate driven shaft 24 and meshes with a corresponding gear 28 fixedly mounted upon the adjacent end of a transversely disposed driving shaft 29, which as will be noted, has one end thereof mounted in suitable bearings arranged upon or provided a transversely disposed supporting bar 30 carried in the forward portion of the supporting frame 9 while the opposite end of said shaft is received in suitable bearings in an adjacent portion of the corresponding sides of said frame 9, the outer end of the shaft 20 carrying a sprocket wheel 31 thereon, about which an endless sprocket chain 32 is engaged, the opposite end or rearward portion of the same being disposed about a sprocket wheel 33 fixedly mounted adjacent the inner side of one of the cultivator supporting wheels 7 as is shown in the Figure 3. Thus, it will be seen that with movement of the wheeled cultivator over a field or other surface to be cultivated, motion will be transmitted from the sprocket wheel supplied wheel 7 to the chain 32 to the driving shaft 29 and from thence by way of the beveled gearing 27 and 28 to the longitudinally disposed intermediate driven shaft 24, from whence it will be transmitted by way of the belt 26 to the cultivator blade carrying shaft 18, thereby effecting rotation of the cultivator blades 22 at the desired speed with which to effectually treat or cultivate or "thin out" the small plants in the rows engaged thereby.

To permit of vertical adjustment of the cultivator blades 22 with respect to the soil or small cotton plants to be cultivated thereby, a yoke-like connecting bracket generally indicated by the numeral 34 is provided, the extremities of the opposite sides of said bracket being suitably connected to lugs or similar devices 35 upon the inner side of the forward portions of the frame 17, while the upper end of said bracket is formed with an extension 36 having pivotal connection with a longitudinally disposed operating lever 37 pivotally mounted upon a suitable supporting standard 38, carried on the frame 9 adjacent the rearward portion thereof as is shown in the Figures 1 and 2, such standard being provided with a fixed and toothed quadrant 39 adapted to be selectively engaged by a manually adjustable locking pawl 40, movably carried upon the outer portion of the lever 37 and adapted to be controlled by means of a hand grip device 41 arranged adjacent the handle portion of said lever 37. In this way, it will be understood that vertical adjusting movement may be imparted to the cultivator blade carrying frame 17 merely by rocking the lever 37 in the desired direction, subsequently to which, said lever may be locked in its adjusted position by engaging the pawl 40 in or between the adjacent piece of the quadrant 39.

It is desirable that the improved cultivator be provided with means other than the rotatable blades 22 for cultivating the soil over which the machine passes and toward accomplishment of this, I may and preferably do equip the cultivator machine with a substantially V-shaped carrying frame 42, pivoting the forward angular portion of said frame 42 as indicated at 43 to a connecting bracket 44 fixedly secured to the rearward and under side of the body portion 1; the angularly opposed sides of this frame 42 carrying a plurality of cultivator shovels 45 by the extension of the shanks 46 thereof into engagement with suitable fastening means, not shown, upon the frame 42. Thus, it will be understood that with the dragging of this pivotally mounted cultivator carrying frame 42 over the soil previously treated by the cultivator blades 22, additional cultivation thereof will be effected, and hence, the growth and yield of the cotton plants will be promoted. To permit the securing of the cultivator shovels 45 upon the carrying frame 42 in an inoperative position, at times, a handle bar 47 is fixedly secured to one portion of said frame 42 and is braced with respect thereto, through the medium of a bar 48, the upper end of this handle bar 47 being so arranged as to be engaged with a spring latch-like member 49 fixedly mounted upon an adjacent portion of the body 1 as is shown in the Figures 1 and 3. Through this arrangement, it will be seen that with forward rocking movement of the handle bar 47, the cultivator carrying frame 42 will be raised to such an extent as to withdraw or disengage the cultivators 45 from the soil being treated, whereupon the intermediate portion of the handle bar 47 will be engaged by the headed portion of the latch-member 49 and thereby, the bar 47 with the frame 42 will be secured in an inoperative position. To release the bar 47, it is only necessary to move the same laterally to such an extent as to disengage it from the headed end of the latch member 49 whereupon the weight of the cultivator carrying frame 42 will be such as to immediately return the cultivator shovels 45 into engagement with the soil. Thus, an effectual form of drag cultivator is afforded the invention.

Manifestly, the construction shown is capable of considerable modification, and such modification as is within the scope of my claims, I consider within the spirit of my invention.

I claim:

1. In a cotton cultivator, a pair of wheels, an axle connecting said wheels, a main frame mounted on said axle, a drive shaft journalled in said main frame, driving means connecting said shaft with one of the wheels, a cutter frame pivotally mounted on said axle, a cutter shaft supported solely by said cutter frame, means arranged in proximity to said axle and cooperating with said drive shaft to rotate said cutter shaft, cutter blades mounted on said cutter shaft and a vertically adjustable cross bar having downwardly depending extensions in pivotal attachment to the second frame to effect vertical adjustment thereof.

2. A cotton cultivator comprising in combination, a wheel structure including an axle, a main frame mounted on said axle, a shaft journalled in said frame, means to drive said shaft, a second frame pivotally mounted on said axle, a cutter shaft supported solely by said second frame, means arranged in proximity to said axle and co-operating with the first shaft to effect rotation of said cutter shaft, cutter blades mounted on said cutter shaft and means to effect vertical adjustment of said second frame and cutters.

In witness whereof I have hereunto set my hand.

CHARLIE JONES.